Figure 1:
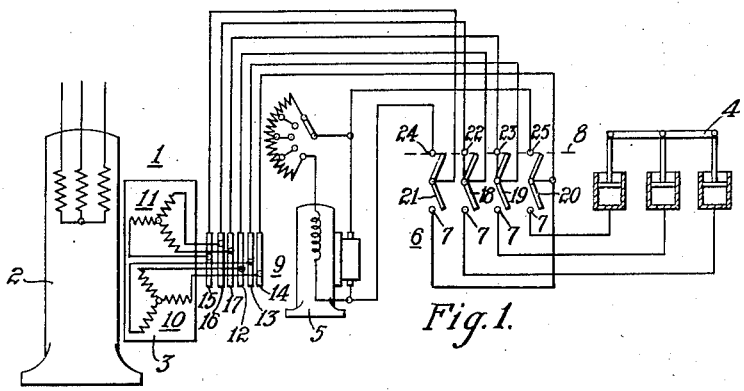

Nov. 10, 1925.

W. E. M. AYRES 1,561,297

ALTERNATING CURRENT ELECTRIC MOTOR

Filed Oct. 23, 1920    2 Sheets-Sheet 1

WITNESSES:

INVENTOR
William Edward Milton Ayres
BY
ATTORNEY

Nov. 10, 1925.

W. E. M. AYRES 1,561,297

ALTERNATING CURRENT ELECTRIC MOTOR

Filed Oct. 23, 1920     2 Sheets-Sheet 2

WITNESSES:
H. T. Shelhamer
W. R. Coley

INVENTOR
William Edward Milton Ayres
BY
Wesley G. Carr
ATTORNEY

Patented Nov. 10, 1925.

1,561,297

UNITED STATES PATENT OFFICE.

WILLIAM EDWARD MILTON AYRES, OF HALE, ENGLAND, ASSIGNOR TO WESTINGHOUSE ELECTRIC & MANUFACTURING COMPANY, A CORPORATION OF PENNSYLVANIA.

ALTERNATING-CURRENT ELECTRIC MOTOR.

Application filed October 23, 1920. Serial No. 418,969.

*To all whom it may concern:*

Be it known that I, WILLIAM EDWARD MILTON AYRES, a subject of the King of Great Britain, and a resident of Hale, in the county of Chester, England, have invented a new and useful Improvement in Alternating-Current Electric Motors, of which the following is a specification.

This invention relates to alternating-current electric motors which are provided with distributed windings on their secondary member and are arranged for synchronous operation and it has special relation to operating systems for such motors during both the starting and running periods.

Electric motors of the kind above mentioned are commonly started into operation as induction motors, the secondary winding being closed through a starting resistor which is gradually cut out until the secondary winding is short-circuited and the motor is running nearly at the synchronous speed. The secondary winding is then excited from a source of direct-current supply and the motor continues to operate, as a synchronous motor. It will be clear that in designing such a synchronous motor, care must be taken to avoid the production of too high a voltage in the secondary member during the starting period and also of too heavy an exciting current through the windings of the same member during the synchronous operation. If, in order to reduce the voltage, the number of conductors in the secondary member is made small, then the exciting current will have to be large in order to obtain the necessary excitation.

According to the present invention, for the purpose of avoiding or reducing these difficulties, the secondary member is provided with a comparatively large number of conductors that are split up into multiple windings, which are used only in part or are connected in parallel relation during the starting or induction period, when a limited open-circuit voltage is desired in the secondary member, but are connected in series relation when required to be used for direct-current excitation during synchronous or running operation. The windings in question are thus connected in a low-current (series) arrangement for running and in a higher current (less-resistance) arrangement for starting.

In carrying out the invention, various arrangements of windings may be employed, which may be two-phase or three-phase or any suitable polyphase combination.

Figure 4:
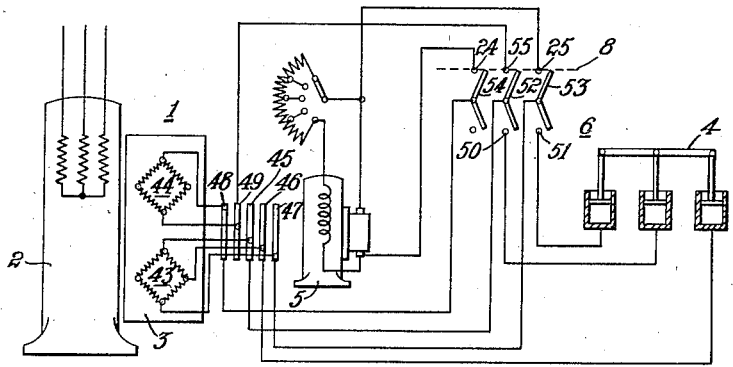
Figure 5:
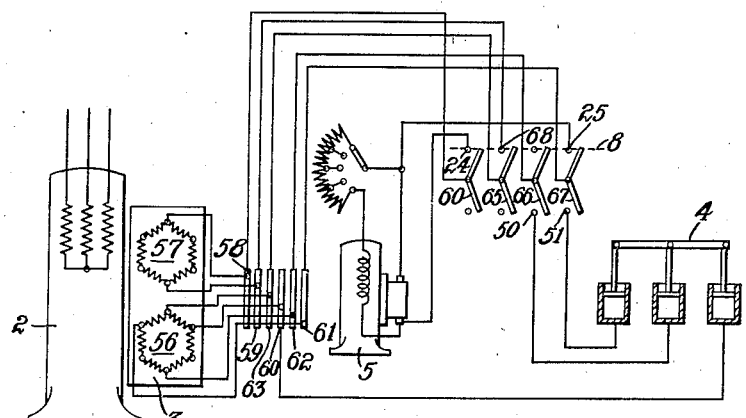
Figures 6, 7:
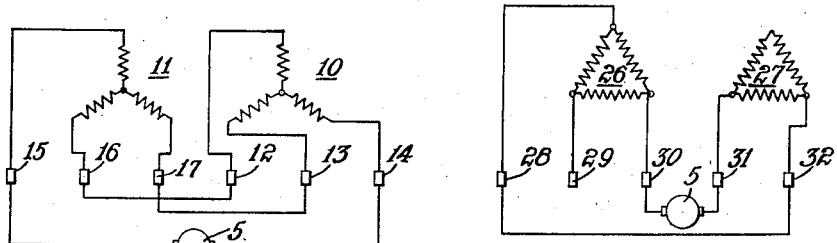

In the accompanying drawings, Figs. 1 to 5 are electrical diagrams illustrating various methods by which the invention may be carried out in practice, and Figs. 6 and 7 are simplified diagrams illustrating electrical connections, as hereinafter explained.

In all of the Figs. 1 to 5, an alternating-current motor is indicated at 1, having a stator 2 and a rotor 3, these parts being shown separated for convenience in tracing the windings. The starting rheostat or resistor that is indicated at 4 is shown as being of the well-known electrolytic type, but any suitable description of variable resistor may be employed. A direct-current generator 5 acts as an exciter when the motor 1 is being operated as a synchronous motor.

In Figs. 1, 2, 4 and 5 a changeover switch 6 is provided with two positions, namely a starting position in which the movable member of the switch makes contact with a series of contact terminals 7 that are suitably connected to the starting resistor 4, and a second or running position of the switch, wherein the movable member makes connection with a series of contact terminals that are indicated generally on the dotted line 8 and which are connected respectively to the terminals of the exciter 5 and to certain of the slip-rings 9 of the motor 1. In all the figures the primary winding of the motor is shown as being located on the stator and the secondary winding on the rotor.

Referring now to Fig. 1, the rotor 3 is provided with two independent star-connected three-phase windings 10 and 11, which are connected to six slip-rings 12 to 17, inclusive. The three slip-rings 12, 13, 14 of the winding 10 are connected to the movable members 18, 19 and 20, respectively, of the change-over switch 6.

The slip-ring 15 is connected to the movable contact member 21, while the slip-rings 16 and 17 are connected to the contact members 22 and 23, respectively, of the switch. The terminals of the exciter 5 are connected to the contact members 24 and 25 of the switch. The movable contact members 18, 19, 20 and 21 of the switch are adapted to be operated simultaneously and in the starting position the contact members 18, 19 and 20 connect with the contact terminals 7, whereby the starting resistance is connected directly to the slip-rings 12, 13, 14 and 15, 16 and 17, respectively, forming the terminals of the secondary windings 10 and 11 of the motor.

Under these conditions, the motor will be started as an induction motor and the starting resistor 4 may be gradually reduced to zero, whereupon the motor will be running nearly at its synchronous speed. The change-over switch 6 is then operated so that the movable members 18, 19 and 20 will be disconnected from the contact terminals 7 and make connection with the contact terminals 22, 23 and 25, respectively, and the movable member 21 will make contact with the contact terminal 24.

Under these conditions, the starting resistor 4 will be cut out, and current from the exciter 5 will traverse the two secondary windings 10 and 11 of the motor in series relation, the circuit being as follows: From one terminal of the exciter 5, through contact terminal 24 of the change-over switch 6, movable member 21 and slip-ring 15 to the neutral point of secondary winding 11, and from the other terminal of the exciter, through the contact terminal 25, the movable member 20 and slip-ring 14 to the neutral point of secondary winding 10. The slip-ring 16 is connected through contact terminal 22 and movable member 18 to slip-ring 12, and slip-ring 17 is connected through contact terminal 23 and movable member 19 to movable member 13.

It will be readily seen from the simplified diagram of connections, Fig. 6, that two of the phases of each of the windings 10 and 11 will be connected in parallel.

In this way, the windings 10 and 11 are connected in parallel relation during starting or induction conditions and in series relation during running or synchronous conditions. Similar means for effecting parallel connection of the independent secondary windings in the remaining figures may readily be made if desired.

Figure 2:
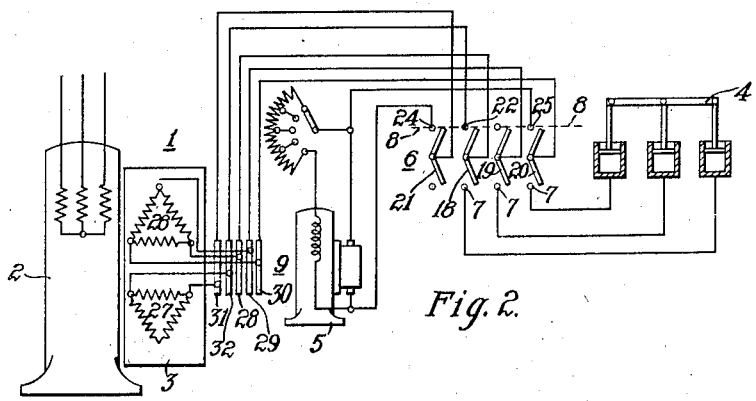

In the arrangement shown in Fig. 2, two delta-connected three-phase windings 26 and 27 are provided on the rotor 3, the windings being connected to five slip-rings as shown. The slip-rings 28, 29 and 30, forming the terminals of winding 26, are connected to the movable members 18, 19 and 20 of the changeover switch 6, the slip-rings 31 and 32 being connected to the movable member 21 and the contact terminal 22 of the switch, and the terminals of the exciter 5 being connected to the contact terminals 24 and 25 of the switch.

With the switch in starting position, the movable members 18, 19 and 20 make connection with the contact terminals 7 and the starting resistor 4 is connected through the slip-rings 28, 29 and 30 to the terminals of the winding 26, the other winding 27 of the motor being open-circuited.

When the switch is moved to the running position, in which the movable members make connection with the contact terminals on the line 8, one terminal of the exciter 5 will be connected through contact terminal 24, movable member 21 and slip-ring 31 to one terminal of the winding 27, while the other terminal of the exciter will be connected through contact terminal 25, movable member 20 and slip-ring 30 to one terminal of the winding 26. The slip-ring 28 will be connected through movable member 18 and contact terminal 22 to slip-ring 32. The slip-ring 29, which is connected to movable member 19 of the switch, will be open-circuited.

A simplified diagram of connections is shown in Fig. 7, from which it will be seen that the delta-connected windings will be excited in series, two coils of each winding being in parallel with the third coil of said winding.

Figure 3:
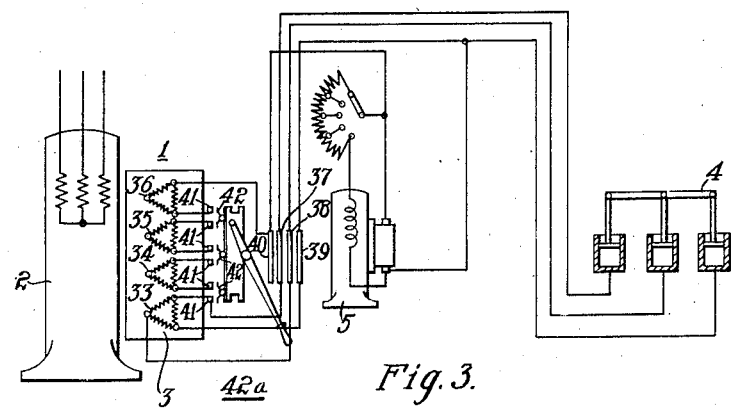

Referring now to Fig. 3, the rotor of the motor is provided with four delta-connected windings 33, 34, 35 and 36, the three terminals of the winding 33 being connected through three slip-rings 37, 38 and 39 to the terminals of the starting resistor 4 and one terminal of the winding 36 being connected through slip-ring 40 to one terminal of the exciter 5, the other terminal of which is connected to slip-ring 39. Connections are brought out from the ends of the four windings of the rotor to contact terminals 41, as shown, which are adapted to be connected through movable contact members 42, forming part of a switch or striking gear 42a which may be manually or automatically operated to connect the rotor windings in series when synchronous speed is nearly attained. The striking gear 42a may be mounted on the shaft of the motor 1 so as to be operated by centrifugal force when synchronous speed is reached or nearly reached, such automatic operation being well understood and needing no further description.

When starting, the movable contact members 42 do not make connection with the contact terminals 41, while the terminals of the delta-connected winding 33 will be connected to the starting resistor through the slip-rings 37, 38 and 39. The exciter will be open-circuited, since the delta-connected winding 36, to which one terminal of the exciter is connected through slip-rings 40, is not connected to any other winding on the rotor.

When synchronous speed is attained or nearly attained, the striking gear 42a may be operated to connect the delta-windings 33 to 36 together through the contact terminals 41, whereupon current from the exciter 5 will traverse said windings in series, entering for example from the slip-ring 40 and leaving by the slip-ring 39. It will be observed that two coils of each delta winding are connected in parallel with the third and that the starting resistor 4 is in parallel relation with the delta winding 33. Equal currents will not, therefore, traverse the rotor windings, but this will be immaterial.

Fig. 4 shows the rotor 3 of the motor as provided with two typical two-phase windings 43 and 44 connected to five slip-rings, three terminals of the winding 43 being connected to the slip-rings 45, 46 and 47, respectively, and two terminals of the winding 44 being connected to the slip rings 48 and 49. One terminal of the starting resistor 4 is connected to the slip-ring 46, and the other two terminals are connected to the contact terminals 50 and 51 of the changeover switch 6. The slip-rings 45 and 47 are connected to the movable contact members 52 and 53 of the switch, and slip-ring 48 is connected to the movable contact member 54, slip-ring 49 being connected to the contact terminal 55. The terminals of the exciter 5 are connected to the contact terminals 24 and 25.

At starting, the movable members 52 and 53 of the switch make contact with the switch contact terminals 50 and 51, and it will be readily seen that the starting rheostat 4 will be connected to the three terminals of the rotor winding 43, the other rotor winding and also the exciter 5 being open-circuited.

When the motor attains nearly synchronous speed and the switch 6 is moved to the running position, one terminal of the exciter 5 will be connected through contact terminal 24, movable member 54 and slip-ring 48 to one terminal of the motor winding 44, the current passing thence through the two halves of the winding 44 in parallel, slip-ring 49, contact terminal 55, movable member 52, slip-ring 45, two halves of the rotor winding 43 in parallel, slip-ring 47, movable member 53 and contact terminal 25 to the other terminal of the exciter. Both of the rotor windings will, therefore, be traversed by the exciting currents and it will be observed that all the coils of the windings are traversed by equal currents. At the same time closed circuits are provided on the winding for damping currents.

Fig. 5 shows an arrangement very similar to that of Fig. 4, but the rotor in this instance is provided with two six-phase windings 56 and 57 that are connected as shown to slip-rings 58 and 59. Two opposite points of the winding 57 are connected to the slip-rings 58 and 59, three alternate points of the winding 56 being connected to slip-rings 60, 61 and 62 and a fourth point of said winding being connected to the slip-ring 63.

The terminals of the starting resistor 4 are connected respectively to the contact terminals 50 and 51 of the changeover switch 6 and to the slip-ring 60. The slip-rings 58, 63, 62 and 61 are respectively connected to the movable members 64 to 67 of the switch 6, the slip-ring 59 is connected to the contact terminal 68, and the terminals of the exciter 5 are connected to the contact terminals 24 and 25.

With the switch in its starting position, the movable members 66 and 67 make connection with the contact terminals 50 and 51, and the starting resistor 4 will be connected through the slip-rings 60, 61 and 62 to the three alternate terminals of the rotor winding 56. The exciter 5 and the rotor winding 57 will be open-circuited.

In the running position of the switch 6, when the motor is running at synchronous speed, the starting resistor 4 will be open-circuited, and an exciting current will flow from one terminal of the exciter through contact terminal 24, movable member 64 of the switch, slip-ring 58, the two halves of the rotor winding 57 in parallel, slip-ring 59, contact terminal 68, movable member 65 of the switch, slip-ring 63, the two halves of the rotor winding 56 in parallel, slip-ring 61, movable member 67 of the switch and contact terminal 25 to the other terminal of the starting resistor. All the rotor windings will therefore be traversed by excitation currents and the same current will flow in all the coils.

The diagrams hereinabove described illustrate various ways in which multiple windings may be applied to the rotors of motors in accordance with the invention. It will be understood, however, that the instances given are merely typical and that the invention is not confined to the precise connections and windings illustrated. The invention is furthermore not limited to the case wherein the secondary windings of the motor are provided on the rotary member thereof, although this is the more usual arrangement.

Consequently, I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. A system comprising a synchronous motor having its secondary element provided with a multiple-part winding, a direct current exciter, and means for effecting a series arrangement of the winding parts for separate excitation during synchronous operation and a parallel arrangement of all said parts during induction operation.

2. A system comprising a synchronous motor having its secondary element provided with a relatively large number of conductors divided into multiple windings, a direct current exciter, and means for effecting a low-current arrangement of the winding parts for separate excitation during synchronous operation and a higher-current arrangement of all said parts during induction operation.

3. A system comprising a synchronous motor having its exciting element provided with a multiple-part winding, a resistor, a source of direct current energy, means for effecting a low-current arrangement of the winding parts and said source of energy during the running period and a higher-current arrangement of all said parts in connection with said resistor during the starting period, and means comprising said resistor for controlling the starting current.

4. A system comprising a synchronous motor having its secondary element provided with a multiple-part winding, a source of direct current energy, means for effecting a series arrangement of the winding parts and of said source of energy during synchronous operation and a parallel arrangement of said winding parts during induction operation and means for limiting the starting current.

5. A system comprising a synchronous motor having its secondary element provided with a relatively large number of conductors divided into multiple windings, respectively star-connected, a resistor, an exciter, and means for effecting a low-current series arrangement of the winding parts and of said exciter during synchronous operation and a higher-current and lower-voltage arrangement of all said parts in connection with said resistor during induction operation.

6. A system comprising a synchronous motor having its secondary element provided with a multiple-part star-winding, a resistor, a source of direct-current energy, and means for effecting a low-current series arrangement of the winding parts and of said source during the running period and a higher-current and lower-voltage arrangement of all said parts in connection with said resistor during the starting period.

In testimony whereof, I have hereunto subscribed my name this 29th day of September 1920.

WILLIAM EDWARD MILTON AYRES.